Patented Dec. 15, 1942

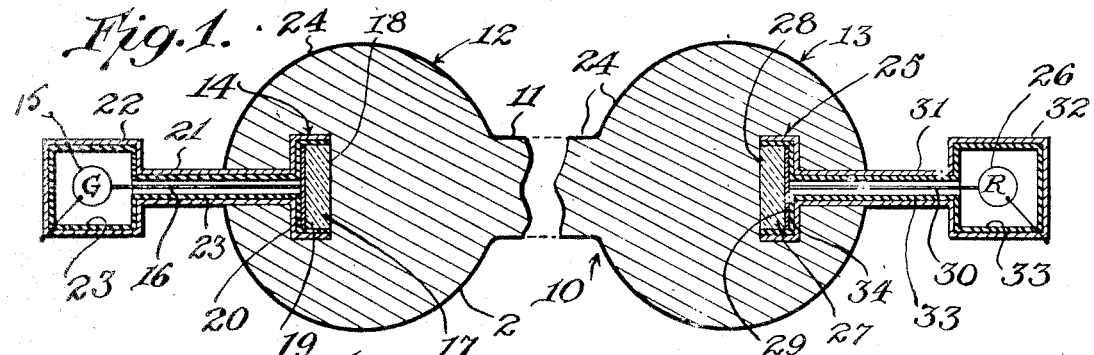
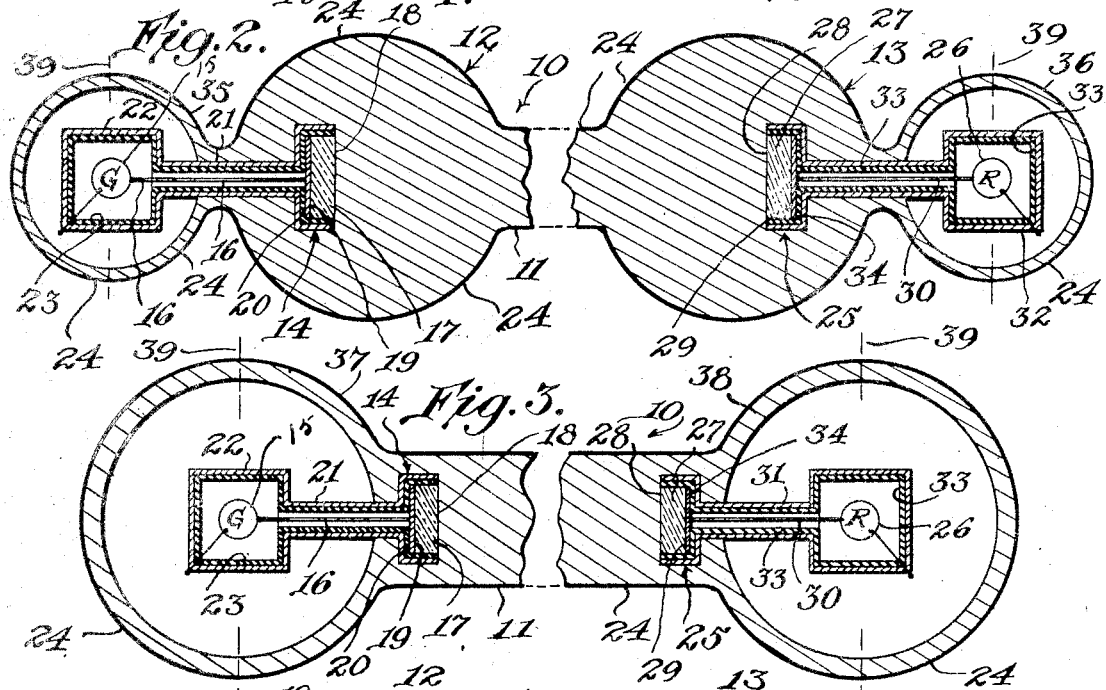
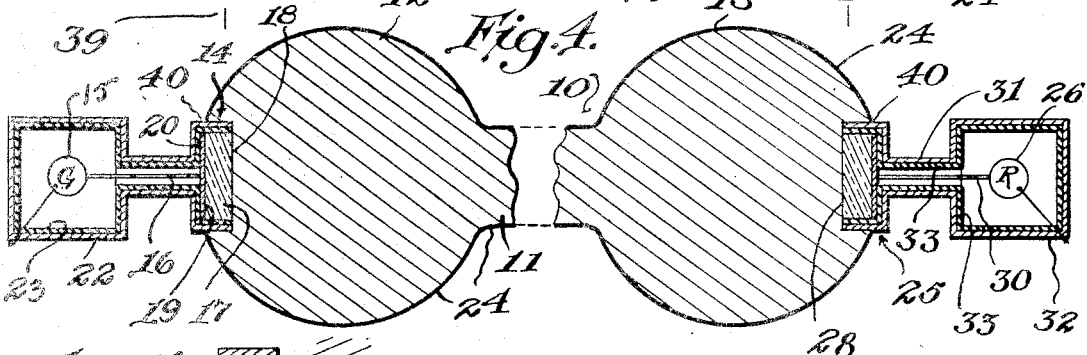
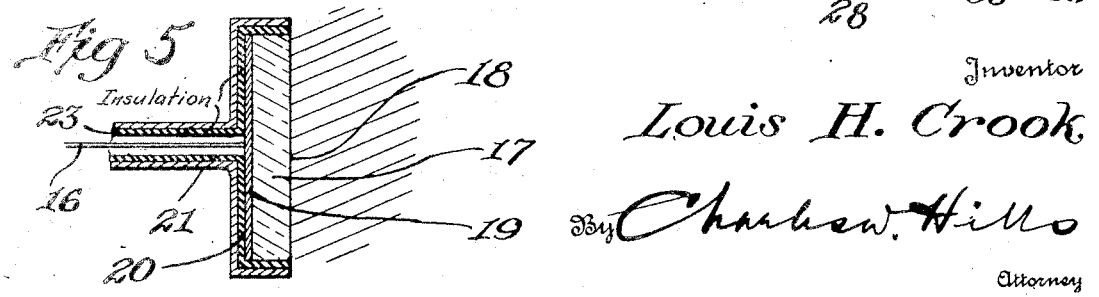

2,304,803

UNITED STATES PATENT OFFICE 2,304,803

TRANSMISSION SYSTEM

Louis H. Crook, Washington, D. C., assignor to The Second National Bank of Washington, trustee, Washington, D. C.

Application November 30, 1938, Serial No. 243,265

23 Claims. (Cl. 178—44)

This invention is related to transmission systems which transmit or guide energy at very high frequencies, and in which the energy is thought of as being guided between generating and receiving apparatus by an energy guide along a single channel.

It is an object of this invention to provide a transmission system employing only a single conductor, and having generating and receiving apparatus housed by and within the conductor.

It is a further object of this invention to provide a transmission system employing an elongated solid body as an energy guide with portions of the body shaped to provide reflecting means.

It is a further object of this invention to provide a transmission system employing a solid conductor having vibratory terminal means therein for conductive connection to generating and receiving apparatus respectively.

It is a further object of this invention to provide an energy guide of conductive metal having portions thereof shaped to define housings to accommodate therein generating and receiving apparatus, respectively.

It is a further object of this invention to provide a transmission system employing a single solid conductor as an energy guide.

It is a further object of this invention to provide a transmission system employing an elongated solid body as an energy guide, and having vibratory terminals positioned within the body and in atomic contact with the material of the body.

It is a further object of this invention to provide body means affording a boundary layer bounding a channel to guide energy between longitudinally spaced points, with vibratory terminal means positioned within the body means and within a zone bounded by the boundary layer.

It is a further object of this invention to provide an elongated body means affording a boundary layer bounding a channel to guide energy, with generating and receiving apparatus, respectively, disposed within said body and within a zone bounded by the boundary layer.

Other and further objects of the invention will be apparent from the following description and accompanying drawing.

Figure 1 is a sectional view of an energy guide, with parts broken, and with parts indicated diagrammatically.

Figure 2 is a sectional view of a modified form of energy guide, with parts broken, and with parts indicated diagrammatically.

Figure 3 is a sectional view of a modified form of energy guide, with parts broken, and with parts indicated diagramatically.

Figure 4 is a sectional view of a modified form of energy guide, with parts broken, and with parts indicated diagrammatically.

Figure 5 is an enlarged sectional view of details of a portion of the apparatus shown in the preceding figures, with parts broken.

In Figure 1 there is indicated generally by the numeral 10 a solid metallic body of conductive material, such as copper, which body comprises an elongated portion 11 providing a guide or transmission line connecting enlarged end portions defining reflectors 12 and 13 at the ends of the body.

In the reflector 12 there is positioned terminal means indicated generally at 14 connected to a generator 15 of potentials at high frequencies by a wire 16.

The terminal means 14 includes a vibratory quartz crystal terminal 17 having its face 18 in atomic contact with the material of the body 10. The face 18 is not merely touching the material of the body, but is so intimately bonded thereto that the expression "atomic contact" seems best to indicate a bond more intimate than can be usually obtained by moderate pressure alone.

It is known that metal can be "soldered" to glass, for instance, with the term "solder" indicating more than mere touching.

The crystal 17 is suitably backed by a metal electrode 19, to which the wire 16 is connected, and the metal electrode is suitably insulated by insulation 20 from a metallic extension 21 of a shield 22 which houses the generator 15 having a terminal in conductive connection therewith. The wire 16 is suitably insulated from the shield by insulation 23. The crystal 17 may be variously mounted with reference to the rear electrode and to the shield, and the mounting described herein is by way of illustration, and not by way of limitation to specific mounting details with reference to the rear electrode and associated parts.

The generator 15 of electric potential at high frequencies excites the crystal 17, causing the crystal to vibrate in a manner well understood by those familiar with the radio communication art.

The excited crystal 17, in turn, excites the particles of the metallic body, and sets up a field of energy which is reflected in the reflector 12 and then propagated by the guide portion 11 of the metallic body.

The electro-mechanical disturbance caused by the excited crystal is reflected and propagated within the skin or boundary layer of the body. This boundary is indicated generally by the numerals 24. It will be understood, of course, that in indicating the boundary of the body, the problem is much like that of indicating the boundary of a glass rod or lens, and a line indicating the boundary is made of substantial thickness for purposes of illustration, and not to indicate the depth of the boundary. The Kennelly-Heaviside layer, or boundary, for instance, is susceptible of being indicated by a line.

It will be obvious that if the disturbance set up by the excited crystal 17 is to be propagated without unwanted reflections in the material of the body 10, then the body should be homogeneous. When the body is homogeneous, the disturbance will be propagated entirely within the boundary layer of the body. Frequencies and wave lengths are contemplated in the propagation of the disturbance such that hard spots and soft spots in the metal of the body will cause unwanted reflection of the propagated energy.

A quartz crystal is illustrated in the terminal means 14, not by way of limitation, but as indicative of means to excite the material of the body. Excitation of the material of the body is not thought of as in connection with thermal agitation of the particles, but, instead, with the electric and magnetic phenomena associated with movement of the body particles and their associated electronic systems.

In the reflector 13 there is positioned terminal means 25, similar to those described in connection with the generator 15, but connected to receiver means 26 responsive to the signal energy sent out by the generator when a quartz crystal terminal 27 becomes excited by the disturbance propagated through the guide 11, and reflected and concentrated in the reflector 13.

The face 28 of the crystal terminal is in atomic contact with the material of the body 10.

The crystal 27 is backed by a metallic electrode 29 which is connected to the receiver 26 by a wire 30 carried through a metallic shielding extension 31 of a metallic shielding housing 32, housing the receiver 26, and suitably insulated therefrom by insulation 33. The metallic electrode 29 is insulated from the shield extension 31 by insulation 34.

It is well understood that there is a best frequency or range of frequencies or wave lengths for trans-Atlantic communication with reference to the Kennelly-Heaviside layer of boundary position and disposition, so it will be obvious that the frequencies employed in the propagation of a disturbance through the guide 11 will be with reference to the diameter, length, and material of the guide medium, and that the shape of the reflectors 12 and 13 will be chosen with reference to the frequencies employed.

The crystals 17 and 27 may have their faces shaped and disposed with reference to the contour of the boundary layer of the reflectors as the reflectors are varied in shape.

In the modified form of the body 10 illustrated in Figure 2, the body is extended beyond the reflectors 12 and 13 to define integrally formed and hollow housings 35 and 36. In these housings the generator 15 and the receiver 26 are housed, respectively, to bring them within the boundary layer 24 of the body.

The terminal arrangement is similar to that described in connection with Figure 1, and similar numerals have been employed to indicate similar parts.

In the modified form of the body 10 illustrated in Figure 3, the integrally formed and hollow housings 37 and 38 form the ends of the guide 11, and the crystal terminals 17 and 27 are disposed within the guide portion 11. The terminal arrangement is similar to that described in connection with Figure 1, and similar numerals have been employed to indicate similar parts. As indicated at 39, portions of the housings 35, 36, 37, and 38 are made movable to permit access to the generating and receiving equipment.

The crystals 17 and 27 obviously will be placed in the medium with reference to determinable constants, which constants include the length and diameter of the guide 11, the nature of the medium 10, and the frequencies employed, in a manner analogous to that in which transmitters are positioned with reference to arrays, frequency employed, and so on, in radio communication.

As shown in Figure 4, the crystals 17 and 27 may be placed in the "eye" of the reflector, and the tubular portion or extension 19 of the shield is then soldered or fused to the body 10, as indicated at 40.

As hereinbefore stated, the disturbance is set up and propagated within the body 10, without affecting similar bodies in proximity thereto. However, means are contemplated, but not described herein, for effecting control of the output of the generator 15 without having to have recourse to wires extending from the body 10. Means are also contemplated, but not described herein, for having access to the signals received by the receiver without necessitating the use of wires extending from the body 10.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A transmission system comprising a single solid elongated body of metal and having generating means and receiving means, respectively, housed by said body.

2. In a transmission system, energy guiding means comprising an elongated and solid body of metal and having integrally formed and hollow ends adapted to house generating means and receiving means, respectively.

3. In a transmission system, energy guiding means comprising an elongated and solid body of metal and having integrally formed enlarged end portions shaped to define reflecting means.

4. In a transmission system, energy guiding means comprising an elongated and solid body of metal and having an integrally formed enlarged portion shaped to define reflecting means.

5. In a transmission system, energy guiding means comprising a solid elongated body of metal and having an integrally formed and hollow portion adapted to house energy utilizing means.

6. In a transmission system, energy guiding means comprising an elongated and solid body having integrally formed and hollow portions adapted to house generating means and receiving means, respectively, and also having integrally formed enlarged portions shaped to define energy reflecting means.

7. In a transmission system, energy guiding means comprising an elongated and solid body of metal and having integrally formed and hollow portions adapted to house generating means and receiving means, respectively, and also having integrally formed enlarged portions shaped to define reflecting means disposed immediately adjacent said hollow portions.

8. A transmission system comprising an elongated solid body of metal, and means in said body and surrounded by the material of said body to produce electro-mechanical movement of the material of said body.

9. In a transmission system, energy guiding means comprising an elongated and solid body provided with integrally formed terminal means shaped to define energy reflecting means.

10. A transmission system comprising an elongated solid body of metal having longitudinally spaced and integrally formed hollow portions, and having generating means and receiving means, respectively, housed by said hollow portions.

11. A transmission system comprising energy guiding means formed of a solid body of metal having an elongated portion provided with integrally formed and longitudinally spaced hollow portions, generating means and receiving means, respectively, housed by said hollow portions, vibratory terminal means disposed in said body and in atomic contact with the material thereof, and in conductive connection with said generating means and said receiving means, respectively.

12. A transmission system comprising energy guiding means formed of a solid body of metal having an elongated portion connecting enlarged and integrally formed end portions defining reflectors, vibratory terminal means embedded in said end portions and in atomic contact with the material of said body, generator means, receiver means, wires conductively connecting said terminals to said generator means and said receiver means, respectively, and metallic shielding means arranged housing said generator means and said receiver means and said connecting wires, and having portions thereof entered in the end portions of said body.

13. A transmission system comprising energy guiding means formed of a solid metallic body having an elongated portion connecting enlarged and integrally formed end portions shaped to define reflectors, vibratory terminals embedded in said end portions and in atomic contact with the material of said body, generator means, receiver means, wires conductively connecting said terminals to said generator means and said receiver means, respectively, and metallic shielding means arranged housing said generator means and said receiver means and said connecting wires, and having portions thereof entered in said end portions of said body.

14. A transmission system comprising energy guiding means formed of a solid metallic body of metal having an elongated portion connecting enlarged and integrally formed end portions shaped to define reflectors, and vibratory terminal means embedded in said end portions and in atomic contact with the metal of said body.

15. In a transmission system, energy guiding means formed of an elongated body of metal having integrally formed end portions shaped to define reflectors, vibratory terminal means housed by said end portions, and energy transforming means in shielded relation to said body and conductively connected to said terminal means.

16. A transmission system comprising energy guiding means formed of a body of metal having an elongated portion provided with integrally formed and hollow ends, vibratory terminal means embedded in said body and in atomic contact with the material of said body, and energy transforming means housed by said hollow ends and conductively connected to said terminal means.

17. In a transmission system, energy guiding means formed of a body of metal having an elongated portion connecting integrally formed end portions shaped to define reflector means, and vibratory terminal means in said end portions and in atomic contact with the material thereof.

18. A transmission system comprising energy guiding means formed of an elongated body, means including said body defining a boundary layer bounding a channel for the propagation of radio waves, and transmitting and receiving means, respectively, disposed in said body within a zone bounded by said boundary layer.

19. A transmission system comprising energy guiding means formed of an elongated solid body, means including said body defining a boundary layer bounding a channel for the propagation of radio waves, and vibratory terminal means disposed in said body and within a zone bounded by said boundary layer.

20. A radio transmission system comprising energy guiding means formed of an elongated body of metal, means including said body defining a boundary layer bounding a channel for the propagation of radio waves, vibratory terminals positioned within said channel, a metallic housing containing energy transforming means and disposed externally of said body but conductively connected thereto, and wires connecting said energy transforming means and shielded by said housing forming a conductive connection between said terminals and said energy transforming means.

21. A transmission system comprising energy guiding means formed of an elongated body of metal, means including said body defining a boundary layer bounding a channel for the propagation of radio waves, vibratory terminals positioned within said channel, energy transforming means, metallic means housing and shielding said energy transforming means and having a portion thereof entered in said body, and wires housed in said shielding means forming a conductive connection between said energy transforming means and said terminals.

22. In a transmission system, an elongated body of current conducting metal, and vibratory terminal means in said body and in atomic contact with the material of said body.

23. A transmission system comprising an elongated and solid body of metal of high current conductivity, means including said conductor defining a channel bounded by a boundary layer, and vibratory terminal means disposed within said conductor and within the zone therein bounded by said boundary layer.

LOUIS H. CROOK.